W. O. STODDARD.
PROCESS AND APPARATUS FOR DESICCATING EGGS.
No. 184,219. Patented Nov. 7, 1876.
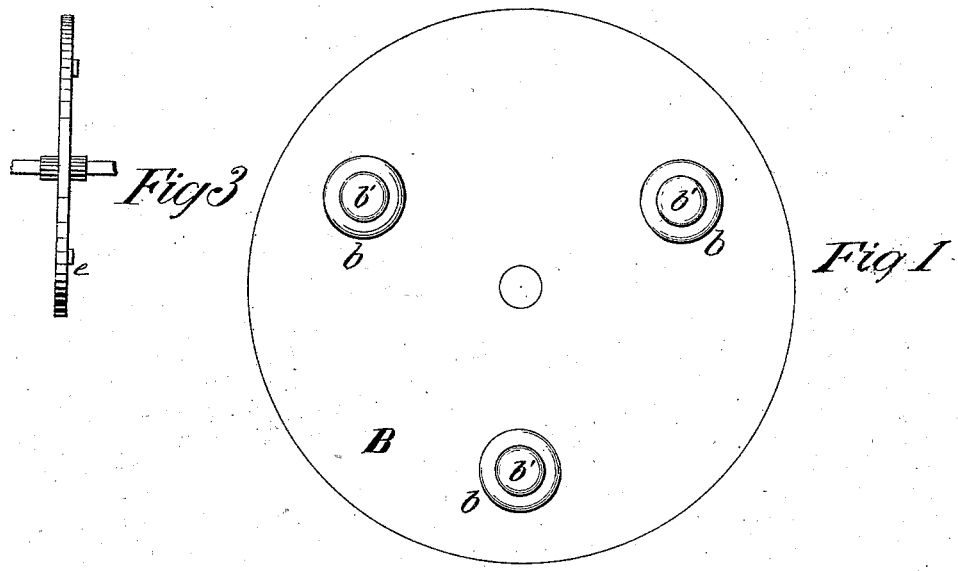
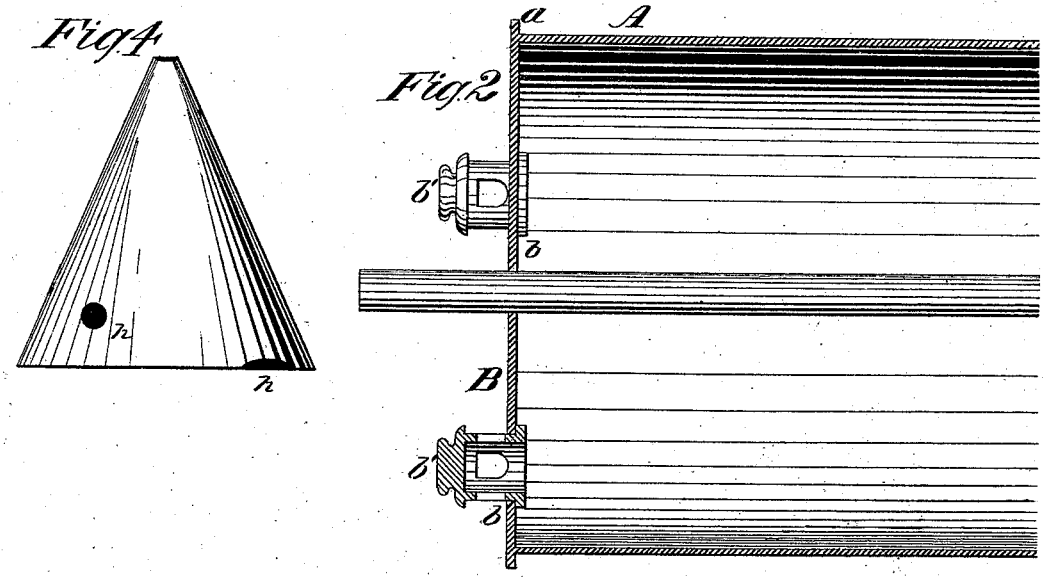

UNITED STATES PATENT OFFICE.

WILLIAM O. STODDARD, OF NEW YORK, N. Y., ASSIGNOR TO AMERICAN EGG COMPANY, OF SAME PLACE.

IMPROVEMENT IN PROCESSES AND APPARATUS FOR DESICCATING EGGS.

Specification forming part of Letters Patent No. 184,219, dated November 7, 1876; application filed March 31, 1876.

*To all whom it may concern:*

Be it known that I, WILLIAM O. STODDARD, of the city of New York, in the county of New York and State of New York, have invented a certain new and useful Improvement in Machinery for the Desiccation of Eggs or other analogous substances; and I do hereby declare the following to be a full, clear, and exact description of the invention, such as will enable others skilled in the art to which it pertains to make and use it, reference being had to the accompanying drawings, which form part of this specification, in which—

Figure 1 is an end view of a desiccating-cylinder constructed according to my improvements. Fig. 2 is a vertical central section through one end and a portion of the body of such a cylinder. Figs. 3 and 4 represent, respectively, views of a desiccating disk and cone embracing my improvements.

The agency ordinarily employed for the desiccation of eggs, the whites and yolks together or separately, or in the form of batter of eggs composed of the yolks and whites mixed or beaten together, is a blast or blasts of air prepared for efficient action in such desiccation by subjecting it to more or less of heat, the said material to be desiccated being poured and retained, under the action of such desiccating-blast, upon some rotating surface, as of a circular disk, or cone, or cylinder, solid or otherwise. Experience has shown that such material cannot safely be subjected in the process of desiccation to a higher temperature than about 80° to 85° Fahrenheit without peril of deterioration and loss of the natural qualities thereof, and has proved at the same time that it is the tendency of any known material, metallic or otherwise, employed for the construction of such rotating drying-surfaces, as indicated, to absorb and accumulate heat, particularly from the desiccating-blast so employed upon them, thereby preventing a proper knowledge, regulation, and adjustment of the temperature or degree of heat to which the said material is so subjected thereon during such process of desiccation.

The object of my invention is, therefore, to present and maintain, for the purposes indicated, a drying-surface in rotation, the temperature of which can be readily ascertained, regulated, and controlled. I accomplish this result by making the said rotating body so employed hollow, and carrying off and reducing the heat thereof by means of interior atmospheric ventilation, and, when necessary, I combine with such ventilation the cooling action of the evaporation thereby of water or other liquid applied to, or contained in, the hollow interior of such drying rotating body. I obtain such ventilation, or evaporation, or both, in the manner indicated in the accompanying drawings, which represent a hollow cylinder prepared for the purposes indicated.

A is the outer shell of the cylinder, provided with the flanges *a* at the ends to prevent any overflow of the material applied thereon for purposes of desiccation. B represents one of the closed ends of the cylinder A, in which are one or more apertures, *b b b*, with movable caps or cut-offs *b' b' b'*, so that one or more or none of such apertures may be opened or closed at will. Each end of the cylinder is similarly provided to secure efficient action, although more or less perfect ventilation can be obtained through one end only.

The principles upon which the ventilating-currents are caused to move are as follows: The moment the drying-blast is applied, whether the temperature be lower or higher than that of the air in the cylinder, the temperature of the latter undergoes a corresponding change, with expansion and contraction, and the equilibrium between the air within and without the cylinder being disturbed air-currents inevitably result on well-known laws, in the natural attempt at restoration. The ordinary operation of the blast is to raise the temperature of the cylinder from ten to fifteen degrees above that of the outside air, and the air-currents generated and playing through the apertures are accelerated continually by the rotation of the cylinder. According as the apertures are opened or closed whole or in part, or the cylinder rotated at a greater or less degree of speed, results a proportionate rapidity of the ventilating currents and consequent ventilation of the cylinder. In case a lower degree of temperature of the drying-surface is required than can be produced by simple ventilation, the cooling effect of evaporation is obtained by the introduction into the hollow interior of the cylinder of a quantity of water or other liquid, in which case the bottom of the cylinder in rotation acts as a reservoir, automatically supplying the evaporating-fluid to the interior surface of the cylinder.

In case a hollow rotating disk should be employed for the purposes indicated it can be ventilated and cooled in a manner similar to that described for the cylinder. Fig. 3 indicates such a hollow disk prepared with apertures, as $c$, for the production of interior ventilation. In case of the use of a hollow rotating cone for the purposes indicated, the supply of evaporating-liquid, if required, could not be given in the manner herein described, but the ventilation would readily be obtained, in rotation, in a precisely analogous manner. Fig. 4 represents such a cone with apertures in its base, as $h$, and at or near its apex for the admission and exit of currents of air set in motion by the rotation of the cone.

I claim as my invention—

1. The process for the desiccation of egg substance or other similar material, consisting in exposing the same for desiccation to blasts of heated air upon a rotating surface artificially maintained at a temperature below that of the drying-blast, such temperature being regulated and controlled so as to prevent injury to the material in process of desiccation, substantially as described.

2. In an apparatus for desiccating egg or other substance in sheets or layers, for the purposes indicated, a hollow rotating body for the reception and desiccation of such substance constructed with ventilating-apertures, as described, so that when the cylinder is rotated and the drying-blast applied a ventilating current or currents of air will be caused to move between the interior and exterior of said cylinder through the apertures, substantially as and for the purpose set forth.

3. In a desiccating apparatus, a hollow rotating body for desiccating purposes having apertures for interior ventilation, and caps or valves to regulate and control the latter, substantially as described.

In testimony that I claim the foregoing I have hereunto set my hand this 28th day of March, 1876.

WILLIAM O. STODDARD.

Witnesses:
LUCIEN BIRDSEYE,
BENJ. H. BAYLISS.